June 19, 1951  P. H. ROYSTER  2,557,143
PROCESS FOR PRODUCING CARBON BLACK

Filed March 19, 1945  2 Sheets-Sheet 1

Inventor
Percy H. Royster
By
Attorney

Patented June 19, 1951

2,557,143

UNITED STATES PATENT OFFICE 2,557,143

PROCESS FOR PRODUCING CARBON BLACK

Percy H. Royster, Raleigh, N. C.

Application March 19, 1945, Serial No. 583,550

13 Claims. (Cl. 23—209.4)

This invention relates to a process and apparatus for the production of carbon black by the thermal decomposition of carbonaceous fluids. It relates particularly to the production of finely divided carbon particles of very small and controlled size by the decomposition of such hydrocarbons as natural gas, coke-oven gas, tar, pitch, still gases, crude oil, petroleum fractions, naphtha, kerosene, propane, butane and the like. In its chemistry, the present process is similar to that employed in the so-called "thermatomic" process which has been fully described in technical literature and has been in commercial use for several decades.

The present invention is a continuation in part of a process described in my application No. 460,658, filed October 3, 1943, entitled "Molecular Alteration of Carbon Compounds and Apparatus Therefor," now Patent No. 2,470,578.

It is the object of the present invention to provide a method of treating a hydrocarbon fluid, e. g., natural gas, to produce a higher yield of carbon black than has been possible by any of the methods which have heretofore been proposed or employed. It is possible by the procedure described herein to produce carbon black of the highest quality while at the same time realizing yields between 20 and 30 pounds of carbon per M (1000 cu. ft.) of natural gas. Carbon blacks fall into three classes: "Channel" blacks (CB), "furnace" blacks (FB), and "thermatomic" or "thermal" blacks (TB). CB and FB—channel and furnace—are produced by the incomplete atmospheric oxidation of various hydrocarbons and have therefore nothing in common with the present process in which oxidation is avoided. The thermatomic blacks (TB) are produced by heating a checkerwork of firebrick to an elevated temperature in one step and thereafter as a second step forcing hydrocarbon gases or vapors to flow in heat-exchanging contact with the heated brick to effect thermal decomposition or "cracking" of the hydrocarbons. The thermatomic process is carried out in a repetitive cycle of these two alternating steps. The present process is a four step process and, therefore, readily distinguishable from all of the thermal processes with which I am familiar.

After several decades of commercial operation, the thermal black process has been found to exhibit the following inherent faults: (1) Because the conventional checkerbrick stove is low in efficiency of heat transfer, decomposition of the hydrocarbon fluid is incomplete unless the checkerbrick is heated to objectionably high temperatures; (2) The carbon formed in the fluid channels between the checkers deposits on the surface of the brick and forms an insulating layer of low thermal conductivity, thereby adversely affecting its already low efficiency; (3) This carbon entrapped in the checkerwork is lost, since it is oxidized during the following step of heating the checkers; (4) Because of the necessity of operating at extremely high temperatures, the carbon black produced exhibits an unsatisfactorily large average particle size; and (5) Because of the large temperature gradients in the fluid stream, the particles size is variable and the quality of the product is not uniform. The present invention constitutes an improvement in the thermal process by which the defects recited above are eliminated.

In the present four step process, conversion of a hydrocarbon fluid is achieved: By passing (step 1) a carbon-bearing fluid through the interstices of an assemblage of chaotically deposited, relatively small, refractory particles, pre-heated to an elevated temperature by forcing (step 2) a stream of non-oxidizing gas (such as hydrogen) to traverse the assemblage, this non-oxidizing gas being heated by passage (step 3) through one or more of a group of regenerative stoves which have been pre-heated by the passage (step 4) therethrough of the hot products of fuel combustion.

Figure 1A:
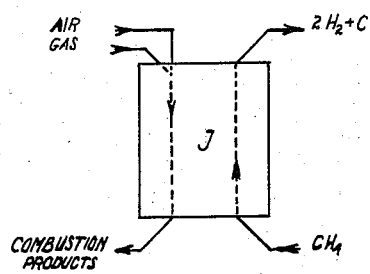
Figures 1A and 1B are purely formal diagrams illustrating two methods of producing carbon black.
Figure 1B:
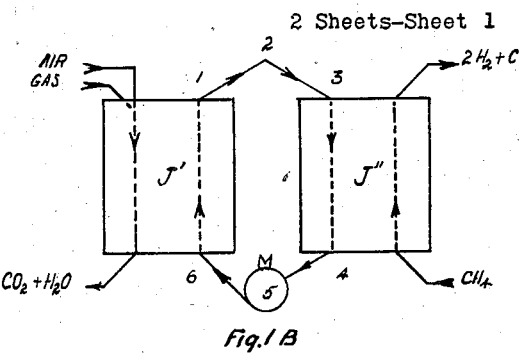

The distinction between the presently invented four step process and the two step thermal process as heretofore carried out can be readily seen by reference to Figures 1A and 1B. The thermal process as heretofore understood is shown diagrammatically in Figure 1A; the presently invented process is shown in Figure 1B. In Figure 1A, gas and air are burned in reaction chamber J in the first step and in the second step a hydrocarbon such as $CH_4$ is passed through chamber J to produce $2H_2$ and C. In my process, gas and air are burned in a regenerative preheater J' as shown in Figure 1B. Methane is forced through reaction chamber J″ to produce 2H₂ and C; and the thermal energy required to carry out pyrolysis in J″ is supplied by circulating a closed, re-cycled stream of non-oxidizing carrier gas, under impetus of blower M, to flow through J′ and J″ in series. The introduction of the non-oxidizing thermal carrier gas circuit marked 1, 2, 3, 4, 5 and 6 (Figure 1B) to transfer heat from preheater J′ to the hydrocarbon fluid passing through chamber J″, is a definitive feature of my invention which distinguishes it from all prior art carbon black processes with which I am familiar.

By using a carrier gas, such as re-cycled hydrogen, to transfer heat, by this doubly-indirect method, from the products of combustion in preheater J′, to the CH₄ in the reaction chamber J″, it is possible to avoid oxidation of the carbon which deposits on the refractories in J″ and thus greatly to increase the yield of black from a given amount of gas treated.

In prior art processes, heat from the burning fuel-gas is transferred to the methane in a singly-indirect step viz., hot products of fuel combustion heat the refractories in J (Figure 1A) and the hot refractories then heat the methane. In the presently invented process, heat from the burning fuel is transferred to the refractories in J′; this heat is re-transferred to the hydrogen passing through J′; the so-heated hydrogen flows through J″; the heat is then re-re-transferred to the refractories in J″; and finally the methane absorbs the heat from the refractories in J″.

In order effectively to carry out the presently invented process with its complicated multiple heat-transferring steps, it is necessary that the refractory masses in the two chambers J′ and J″ exhibit a high degree of thermodynamic reversibility. It is difficult, if not impossible, to achieve economical and efficient production of carbon black unless the refractory medium in the chamber exhibits an efficiency comparable with that of the so-called "pebble bed" described in my application No. 460,658 or in U. S. Patent 1,940,371. It is possible, of course, to use a preheater J′ designed in the form of a conventional checkerbrick stove with an objectionable but not intolerable increase in construction costs and a similar decrease in thermal efficiency as compared with the pebble stove which I prefer. It is not possible, however, to attain an acceptable degree of technical success with my process unless a pebble bed is used as the heat-exchanging refractory in the reaction chamber J″. For the purpose of a definition, a "pebble bed" is described as an assemblage of chaotically deposited, relatively small, refractory particles, freely bedded within a thermally insulated gas-tight chamber. The material used for "pebbles" may be gravel, glacial drift pebbles, sandstone particles, crushed firebrick, dead-burned magnesite, calcined limestone, silicon carbide, fire-clay shapes, graphite, coke, cast iron, steel, chrome ore, alumina or, in general, any regular or irregular solid particles regardless of shape or composition which are "relatively small," a term which in practice means usually between ⅛ and 2½ inches. This is another way of saying that the interstitial passages between the particles shall exhibit a mean hydraulic radius (M. H. R.) of from 0.01 to 0.75 inch.

The thermal conduct of an unstable hydrocarbon fluid, forced to flow through tortuous passages of small M. H. R., differs markedly from that which obtains when the same gas is caused to flow through the relatively large channels in a conventional checkerbrick interchanger. The conversion of methane and many other hydrocarbons into hydrogen and carbon is strongly endothermic. Whenever thermal decomposition occurs, the fluid is subjected to a very large cooling effect. If the gas channels or passages are rectilinear and/or of large dimensions, objectionably large temperature gradients in the gas stream result. Those portions of the fluid stream immediately adjacent the brick surfaces are maintained at an elevated temperature closely approaching that of the brick itself despite the enormous endothermic absorption of heat. Other portions of the fluid stream, however, more widely removed from the channel wall are cooled far below brick temperature. As a result of such unavoidable temperature gradients, the hydrocarbon is not subjected to uniform thermal treatment, and the size of the carbon particles formed is not uniform. That portion of the fluid which passes near the wall is not only heated to high temperature, but also is maintained at this high temperature for a long time, since the velocity of the fluid immediately adjacent the wall is low. Those portions of the stream which flow near the center of the fluid channels, on the other hand, are not heated to brick temperature and the time during which they remain insufficiently heated is brief, since the velocity of the fluid near the center of the channel is high. As a result of this non-uniform thermal treatment, part of the carbon black is produced by being held at high temperature for such an extended time that excess growth of the carbon particles occur. Other parts of the same fluid are insufficiently heated and remain hot for such a brief time that complete conversion of hydrocarbon to carbon black is not realized and the yield is low.

Carbon black finds its readiest present market as a filler for rubber tires. It is outstanding in its ability to resist wear; but this resistance to wear is inversely proportional to the particle size. Only channel blacks (CB) exhibit a small enough particle size to be satisfactory for reinforcing tire treads. In the thermal process (TB), by working at low temperatures, relatively small particle sizes can be obtained with, however, extremely low yields. Yields as high as 8 to 14 lbs. of TB per M of natural gas can sometimes be realized by heating the checkwork to maximum temperatures and by using a low fluid velocity. Unfortunately, the average particle size of the TB, made by this make-shift procedure, usually exceeds 2,000 Å. (Ångstrom units).

When a hydrocarbon fluid e. g., natural gas or methane, is forced to flow through an assemblage of pebbles, screened say through 2-inch on 1-inch or through ⅝-inch on ⅜-inch, the thermal changes taking place in the gas are altogether different than in the case of the checkerbrick just described. The M. H. R. of the ½-inch pebbles is 1/16 inch and the "channels" in a pebble bed are tortuous and branched. The gas in motion is subjected to enforced turbulence and to continual mixing, so that every portion of the gas stream in transit through the bed is subjected to identical thermal treatment. No thermal gradients of technical significance can exist in the fluid phase. As the hydrocarbon is thermally decomposed into carbon and hydrogen, the endothermic heat is supplied by the heat stored in the pebbles and objectionable cooling of the gas itself is thus avoided.

Figure 2A:
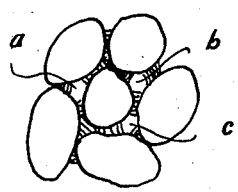
Figures 2A and 2B are wholly conventionalized sections of a bed of pebbles partly clogged with carbon.
Figure 2B:
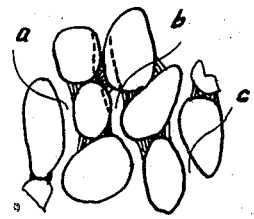

As the hydrocarbon decomposed to produce finely divided particles (dust, fume or soot) suspended in the gas stream, a substantial amount of such carbon powder is entrapped in the narrow gaps, cracks and crannies between the individual pebbles in those places where the fluid velocity is low. As thermal decomposition proceeds, increasing amounts of carbon black are entrapped in the bed. As this continues, the percentage of voids in the bed decreases. As a consequence, the velocity of the gas flowing through the interstitial passages is increased. Ultimately a "steady state" is reached when as much carbon is blown out of the bed as accumulates in it. When this state is reached, the bed has the general appearance as shown in Figures 2A and 2B. Figure 2A is a highly diagrammatic and somewhat formalized plan view of a pebble bed partially sectioned in a plane drawn at right angles to fluid flow. The cross-hatching is supposed to represent areas filled with entrapped carbon black. The several fluid channels remaining open are indicated as $a, b, c. . . .$ Figure 2B represents a vertical section through the same bed sectioned in a plane parallel to the fluid flow. The several channels $a, b, c . . .$ are seen to be tortuous and branched. Strangely enough the accumulation of carbon black in a pebble bed acts to increase efficiency of heat transfer by decreasing the M. H. R.—a result which is diametrically opposite to the effect of accumulated carbon dust in a conventional checkerbrick stove, where layers of soot coating the brick thermally insulate the brick and impair efficiency.

In normal operation, when the accumulation of carbon black in the bed has reached its steady state value, its presence is without detrimental effect on the presently described process. Further accumulation of carbon does not usually take place and thereafter all of the carbon formed by thermal decomposition is blown out the exhaust and is recovered as a marketable product. When the time and temperature are properly adjusted, better than 90% of the carbon originally contained in the inlet gas is converted into carbon black and is discharged with the exhaust. With a properly designed electrostatic precipitator, more than 95% of the exhaust carbon may be recovered. The over-all recovery of carbon black in my process, therefore, will frequenly exceed 85%. This recovery is independent of the temperature of the decomposition reaction. In order to produce carbon black particles as small as 50 Å. or even 100 Å., it is necessary to control the pebble temperature to a very low figure. Corresponding to such low reaction temperatures, the time of the thermal treatment must be greatly extended. This is accomplished by providing a pebble bed of inordinately large volume. Since the cost of a pebble stove per cu. ft. is very low, this method of producing carbon blacks of extremely small particle size is not only effective but perfectly practicable.

In actual plant operation, complete control of thermal conditions is not always possible. If excessive temperatures occur from time to time, growth of the particles entrapped in the bed may occur causing clogging to such an extent that excessive pressures are required to force the gases through the reactors. It is always recommended that the reaction chamber be constructed to provide means for easily removing a fouled pebble bed from the chamber and for re-charging a fresh supply of pebbles. This provision for removing the heat-interchanging medium when excessive fouling with accumulated carbon takes place, is an exclusive characteristic of the pebble stove which makes it well adapted to effecting heat transfer between solids and fume-laden gases. Renewal of the refractories is, of course, not possible with conventional checkerbrick construction.

Figure 3:
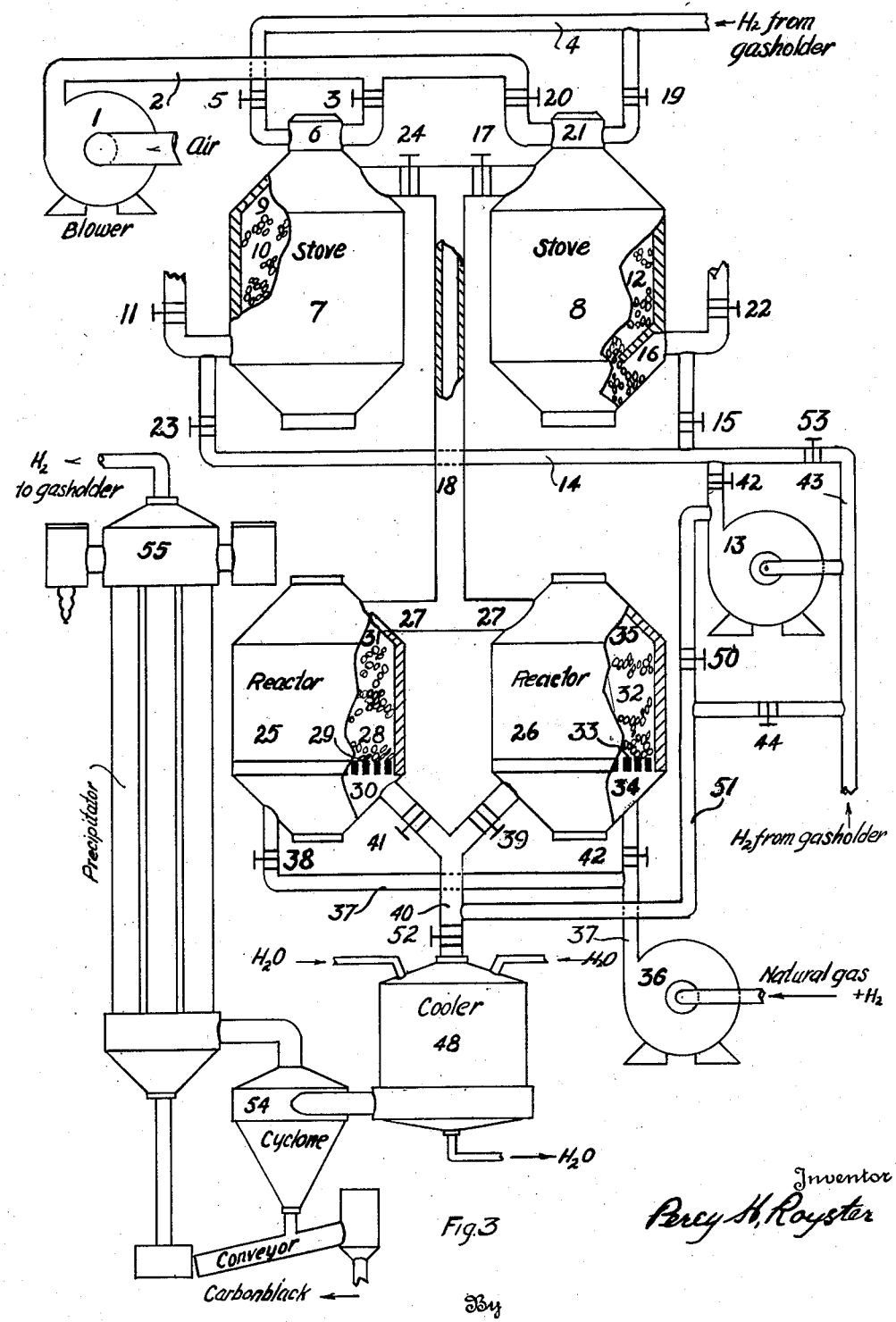
Figure 3 is a diagram, partly in section, showing apparatus adapted to the production of carbon black by my process.

An understanding of the presently invented process can be had from the following detailed description of the operation of a plant for producing carbon black of channel quality. In Figure 3, two pebble stoves 7 and 8 are shown of the type and construction described in my application 460,658 and in my U. S. Patent No. 1,940,371. At the start of the operation described (noon), stove 7 is "on combustion" and stove 8 is "on carrier." Motor driven blower 1 forces 5,000 cu. ft. per minute of air through draft main 2 and open draft valve 3 to burner 6. Fuel-gas main 4 is supplied with 1350 cu. ft. per minute of hydrogen, produced in the process, which, flowing through open gas valve 5, enters burner 6 to burn in open space 9 within stove 7 above pebble bed 10. The hot products of combustion flow downwardly through bed 10 and discharge through open chimney valve 11 to atmosphere. At noon, the pebbles in the pebble bed 12 in stove 8 had been heated in forenoon operation. A stream of $H_2$ or other non-oxidizing gas is supplied to motor driven blower 13 which forces 5,000 cu. ft. per minute of hydrogen through booster main 14 and open valve 15 into the louver 16 in the bottom of stove 8. This stream of hydrogen flows upwardly through bed 12 and discharges through open valve 17 into hot booster main 18. This operation is continued from noon until 12:30 p. m.

At 12:30, valves 3, 5, 11, 15 and 17 are closed. Stove 8 is now placed "on combustion" by opening gas valve 19 and draft valve 20 to permit flow of fuel gas and of air to burner 21 which, after combustion, pass downwardly through bed 12, exhausting through open chimney valve 22 to atmosphere. Valve 23, at the bottom of stove 7 is opened, permitting hydrogen from blower 13 to enter the bottom of stove 7, to pass upwardly through pebble bed 10 enclosed therein, to traverse open space 9 and to discharge through open valve 24 into booster main 18. Throughout all of the several operations described below, the pair of regenerative stoves 7 and 8 are operated alternately as described above, each reversing its functional role of "on combustion" and of "on carrier," whereby to supply heated hydrogen to the reactors.

Two reaction chambers, 25 and 26, are connected at the top by "cross-over" conduit 27. Each of these chambers is filled with 48 tons of sandstone pebbles averaging ¾ inch in diameter and forming a bed, 10 ft. 8 inches in diameter and 10 feet deep. Bed 28, within chamber 25, is supported on grate-bars 29 above open space 30. An open space 31 above bed 28 communicates directly with cross-over 27. Pebble bed 32 in chamber 26 is similar to bed 28, being supported on grate bars 33 above open space 34. The open space 35 (above bed 32) plus cross-over 27 plus open space 31, total 195 cubic feet.

Natural gas, from a gas well or a pipe-line, pure or diluted with $H_2$, is forced by motor driven blower 36 through inlet main 37 and open valve 38 into open space 39 in stove 25. Gas from open space 39 flows upwardly through bed 28 into space 31 (from left to right) through cross-over 27 into open space 35, from which it flows downwardly through bed 32 into open space 34 and, by way of open valve 39, into reacted gas main 40. This operation is termed "direct flow." When valves 38 and 39 are closed and valves 41 and 42 are open, the natural gas mixture enters open space 34 in stove 26, passes upwardly through bed 32; flows (from right to left) through cross-over 27 and downwardly through bed 28 into open space 30; from which it continues through open valve 41 into reacted gas main 40. This operation is termed "reverse flow."

For the purpose of this description, it is assumed that the two pebble beds 28 and 32 are at 100° F. at noon; that the pair of regenerative stoves 7 and 8 are heated to deliver hot hydrogen through conduit 18 into cross-over 27 at 2600° F.; and that a supply of hydrogen (produced during forenoon operation) sufficient to fill the several chambers shown in Figure 3 is available in a gas holder (not shown). Blower 13, taking in hydrogen by way of inlet conduit 43, blows 5,130 cu. ft. per minute by way of open valve 42 through stoves 7 and 8 alternately. At noon, hot hydrogen from one of the stoves, traversing conduit 18, flows through the left-hand half of cross-over 27 and downwardly through bed 28, exhausting through gas main 40 and through the recovery system for several minutes until all of the air is purged from the circuit. Valve 44 is then opened and valve 52 closed. Hydrogen is thereafter continually re-circulated by means of blower 13, passing through stoves 7 and 8 alternately, at thirty minute stove reversals, and continuing downwardly through bed 28, thereby heating the pebbles in the upper portions of this bed to just above 2600° F.

Figure 4:
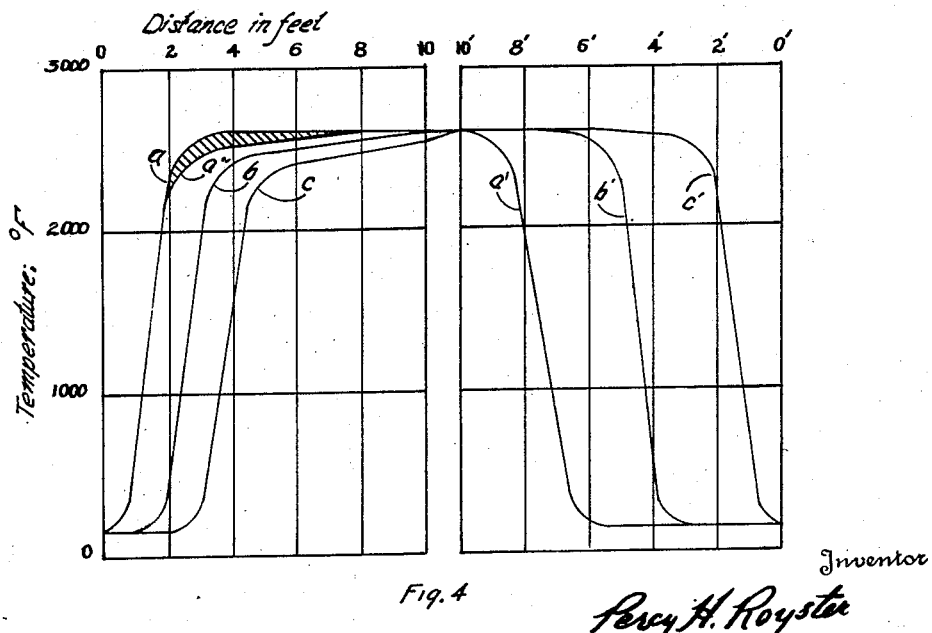
Figure 4 is a temperature-distance curve to scale showing the temperature distribution in the reaction chambers.

As the flow of hydrogen continues downwardly through bed 28, a thermal wave, established in this bed, moves downwardly at the rate of 0.5 inch per minute. At 3:30 p. m., the 1400° F. isotherm is 18 inches above grate bars 29 and the temperature in bed 28 is given by the curve $a$ in Figure 4. In Figure 4, the abscissae indicate the distance in feet in bed 28 measured upwardly from the grate bars 29 (at the extreme left of Figure 4) to the top of bed 28, corresponding to the abscissa marked 10 ft. (middle of Figure 4). Distances in bed 32 are given, starting from grate bar 33 (at the extreme right of Figure 4) the distance above grate 33 being marked with primed numerals from 0' to 10' feet.

At 3:24, when the temperature distribution in bed 28 corresponds to curve $a$ in Figure 4, valve 41 is closed and valve 39 is opened, whereby hydrogen from conduit 18 flows downwardly through bed 32. This flow of hydrogen is continued from 3:24 to 4:24 p. m. The 1400° F. isotherm in bed 32 is then 7 feet, 6 inches above grate 33, and the temperature distribution in bed 32 corresponds to curve $a'$ in Figure 4. Flow of hydrogen is then terminated.

Valves 17 and 24 are closed; blower 13 is shut down; valves 38, 39 and 52 are opened. Natural gas is forced, diluted with $H_2$ from the gas holder, by blower 36 at the rate of 1050 cu. ft. per minute of $CH_4$ and 1950 cu. ft. per minute of $H_2$ into open space 30, from which it flows upwardly through bed 28, from left to right through conduit 27, downwardly through bed 32, exhausting through valve 39 into conduit 40 from which it flows through open valve 52 through the carbon black recovery system. This constitutes "direct flow" through reaction chambers 25 and 26. The natural gas mixture in passing through the lowest two feet of the bed 28 is rapidly heated.

When the gas reaches the temperature of 2400° F., decomposition of hydrocarbons become noticeable. Due to the endothermic reaction, the temperature of the pebbles in bed 28 is lowered and the upper portion of curve $a$ in Figure 4 is depressed until it corresponds to the curve $a''$ at 4:52. The shaded area between curve $a$ and $a'$ indicates cooling of the pebble bed as the result of transferring 700,000 B. t. u. of sensible heat from the pebbles to the natural mixture gas due to its thermal decomposition.

At 5:07 p. m., when "direct flow" has continued for 43 minutes, the temperature distribution in bed 28 is given as curve $b$; and the temperature in bed 32 corresponds to curve $b'$. It should be noted that the flow of gas passing downwardly through bed 32 is much greater than the gas flowing upwardly through bed 28, and that the velocity at which the isotherms are "blown down" through bed 32 is greater than the velocity of ascent of the isotherms in bed 28. At 5:50 p. m., after 86 minutes of direct flow, the temperature distribution in the two reaction chambers is given by the combined curve $c$—$c'$ in Figure 4. During this time, 90 M of natural gas was blown through the reactor and 1900 pounds of carbon black was produced.

In order to maintain conversion of methane into hydrogen and carbon during the operation just described, it was necessary to supply the gas stream with 8,320,000 B. t. u. which was absorbed by the endothermic reaction. At 4:24 p. m. (when the production of carbon black was started), the temperature of the hydrogen delivered through conduit 18 was raised to 3100° F. by increasing the flow of fuel gas through main 4 alternately to burners (16 and 21) to 1670 cu. ft. per minute. In order to supply this eight million B. t. u. to the methane circuit, it is necessary to force an average flow of 5500 cu. ft. per minute of hot $H_2$ through booster conduit 18, into cross-over 27. This flow of "booster gas," however, is not blown in at a constant rate. At the beginning of the "direct flow," in fact, no booster gas is necessary, the necessary heat of the reaction being supplied by the hot pebbles in reactor 25. By reference to Figure 4, it is observed that an abrupt temperature rise is shown between the 10 and the 10' abscissae for curve $c$—$c'$ indicating the jump in temperature experienced by the gas while flowing from the top of bed 28 to the top of bed 32, due to the admixture of hydrogen preheated to 3100° F. into the stream of partly reacted methane. It is recommended that Leeds and Northrup radiation pyrometers be installed in open spaces 31 and 35 to record the temperature therein and that automatic equipment be provided to control the flow of hydrogen entering cross-over 27 from conduit 18 to maintain a constant 2600° F. temperature in the "down-stream" open space 35 during direct flow.

At 5:30 p. m., reverse flow is initiated. Valves 38 and 39 are closed and valves 41 and 42 are opened, so that the natural gas mixture flows through the pair of chambers 25 and 26 in reverse and the isotherms in bed 32 are blown upwardly while those in bed 28 are blown downwardly. Curve $c'$ in bed 32 is translated (from right to left in Figure 4) at the rate of 0.34 inch per minute and curve $c$ is translated from right to left in the figure (downwardly in the actual bed) at the rate of 0.88 inch per minute. At the end of 28 minutes (6:18 p. m.) curve $c$ in Figure 4 will be shifted to the left 25 inches bringing the 1400° F. isotherm 22 inches above grate 29.

When further continuation of reverse flow is permitted, the temperature of the gas exhausting through valve 41 begins to rise rapidly. Two alternate methods of operation are acceptable here. If valve 41 is constructed to resist high temperature e. g. is water cooled, and if a cooler 48 is installed in exhaust main 40 with sufficient cooling water to cool the gas to lower temperature, reverse flow can be continued until 8:47 p. m., at which time the whole bed 28 will be heated well above 2500° F. from top to bottom. This operation, of course, entails a large loss of heat out of the exhaust; it calls for increased construction cost to resist high temperatures in the exhaust conduits; it necessitates water cooling grate-bars 29 and 33 and it also requires a considerable supply of cooling water which may not be available. If no by-product use can be found for the excess hydrogen produced in this process, the loss of heat is without economic significance. Wherever water for cooling is available, I recommend this method of blowing thermodynamically degenerate heat through the grate bars and into cooler 48. As an alternate, at 6:18 p. m., when the thermal wave in bed 28 has been blown down to within 22 inches of grate 29, reverse flow may be terminated. In this second procedure, blower 36 is shut down; valves 38 and 41 are closed, blower 13 is started up, valve 44 is closed and valve 50 in conduit 51 is open. Valve 52 is closed and hydrogen gas from blower 13 flows through conduit 51 into exhaust-main 40. Cold hydrogen from 40 flows through valve 39 to the bottom of stove 26, exhausting through open valve 17, downwardly through bed 12, and through open valve 15, flowing into conduit 14 and through open valve 53 to the inlet of blower 13. This operation is termed a "thermal shift" step, in which a circulating stream of hydrogen passes upwardly through chamber 26, thereby shifting the isotherms in bed 32 upwardly, while no gas of any kind is flowing through bed 28. The heat which is removed from bed 32 is thus transferred to the pebble bed 12 in stove 8 and bed 10 alternately. As the hydrogen, heated to 2600° F. by passage through bed 32, flows downwardly through beds 10 and 12 optionally, heat is transferred to the pebble beds and the cooled hydrogen emerges from the stove, exhausting through valves 23 and 15 and returning to the inlet of blower 13. In this second procedure, the step of shifting the isotherms in one of the pair of reactors while leaving the temperature distribution in the other reactor unchanged avoids the loss of heat which occurs in the first procedure. It also obviates the necessity of constructing the exhaust main resistant to high temperature. It also reduces the amount of cooling water required. This second alternate operation is recommended wherever a carbon-black plant is constructed in conjunction, say, with a steam power plant using natural gas as fuel and where the exhaust hydrogen may be burned under boilers to generate steam. A second industrial example of an operation in which the above described "thermal shifting" step is recommended, is in connection with the production of synthetic ammonia, where exhaust hydrogen from my carbon black plant may be used as a by-product. A similar case will be where hydrogenation of petroleum fractions is attempted in joint operation with the production of carbon black.

If the thermal shifting step is undertaken, at 6:18 p. m., 10,000 cu. ft. per minute of hydrogen from blower 13 is passed upwardly through bed 32 for 56 minutes. This upward flow of cold hydrogen through chamber 26 will bring the 1400° F. isotherm to a position 30 inches below the top of bed 32 by 7:14 p. m. The total natural gas treated between 4:24 and 7:14 p. m. was 122 M producing 2440 pounds of carbon black in a total operating time of 170 minutes. This is a daily production of 10 tons. It is observed that in the second procedure the effort to economise heat has caused a loss in tonnage. By the first described alternate, the rate is 15 tons per day.

In the above illustration of my invention while producing carbon black of "channel quality," it is seen that I have taken advantage of the "dilution method" which was described so far as I know, first by Emerich Szarvasy in U. S. Patent No. 1,383,674. Szarvasy discovered that diluting natural gas with hydrogen promoted the formation of carbon black of fine particle size. When undiluted methane is heated, binary molecular collisions occur between methane molecules. At each collision, the following four reactions take place:

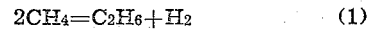
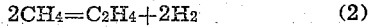
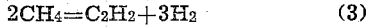
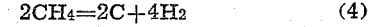

$$2CH_4 = C_2H_6 + H_2 \quad (1)$$
$$2CH_4 = C_2H_4 + 2H_2 \quad (2)$$
$$2CH_4 = C_2H_2 + 3H_2 \quad (3)$$
$$2CH_4 = 2C + 4H_2 \quad (4)$$

Under the drastic thermal treatment required to effect complete decomposition of methane (Equation 4), any ethylene or acetylene formed is rapidly decomposed to carbon and hydrogen. Nevertheless the transient existance of these unsaturated hydrocarbons with double and triple carbon bonds act as carbon aggregates, suspended in the gas stream, which function as nuclei on which carbon atoms (produced according to Equation 4) attach themselves to form oversized particles of carbon black.

The rapid heating of the natural gas mixture in my present process tends to suppress the reactions given in Equations 2 and 3 above. Inevitably a small amount of ethylene and acetylene is always produced. The dilution of the natural gas fed to the reactor as illustrated above diminishes the number of collisions between two methane molecules. Collisions between methane and hydrogen do not produce unsaturated molecules, therefore, the effect of diluting the natural gas before its entrance into the reaction chamber is of some value, when employed in conjunction with the very rapid heating experienced by the gas in flowing through a pebble bed.

Although some improvement in particle size can be realized, as shown in the present illustration, by taking advantage of Szarvasy's method, unfortunately a serious loss in tonnage is encountered. If one attempts to dilute the natural gas with an excessive amount of re-cycled hydrogen (e. g., two parts or more of hydrogen to one part of methane), the volume of total gas mixture to be forced through the reaction chambers will be prohibitively large, the size of the electrostatic precipitator or bag filters used for separating the carbon black from the exhaust gas will be out of reason, and the over-all economy of the process will be seriously impaired. For this reason, I never recommend an inlet gas mixture containing less than 35 to 45% hydrocarbons and I usually prefer to maintain the hydrocarbon content of the inlet gas well above 45% even in producing blacks of the finest particle size.

In the operation of my process between 4:24 and 5:50 p. m. during "direct flow," the reacted gas, fouled with carbon black, is discharged through open valve 39, into the reacted-gas main 40 and passes through open valve 52 to discharge into the carbon black recovery system. The chamber 48 represents a water-sprayed cooler of conventional design. When operating my process using the "thermal shift" step described above, gases flowing through conduit 40 are usually below 200° F. and no water spray is necessary. Gases discharging from cooler 48 flow through the cyclone or "multiclone" 54 in which a portion of the (usually larger) particles are removed. The gas, stripped of part of its carbon black loading, passes through the Cottrell precipitator 55 in which the remaining suspended carbon particles are removed from the gas. When an exceptionally high recovery is economically indicated, or when hydrogen of extreme purity is required for by-product use, two or more Cottrell precipitators may be placed in series. Optionally a bag-house filter may be used either as a substitute for a Cottrell precipitator or the cyclone or may be operated in series with either or both. The recovery of carbon black in my process does not differ in any substantial way from the conventional recovery system in the FB and TB processes, except for the fact that the loading of carbon black per cubic foot of exhaust gas in my process is much greater.

In illustrating the operation of the process described in my co-pending application 460,658, Examples VI, VII, VIII, IX and X therein were concerned with the pyrolysis of methane or natural gas to form ethylene, acetylene and hydrogen according to the Equations 2, 3 and 4 above. For the purpose of simplicity of explanation, it was assumed in my prior application that the natural gas was: (A) treated at a low temperature (1970° F.) for a short time (0.091 second) to produce a substantial amount of ethylene (14.05%), which was extracted from the exhaust gases. The "spent" gas exhausting from this thermal treatment A containing 63.88% methane was then (B) passed through a second set of reaction chambers and treated therein at a higher temperature (2037° F.), whereby substantial amounts (9.5%) of acetylene was formed. The "doubly spent" gas from this second operation (B) was then (C) passed through a third set of cracking chambers and treated at a still higher temperature (2600° F. to 3100° F.) to produce carbon black and hydrogen. In that application, acetylene was also reacted with the ethylene to form 1.3 butadiene, and in another illustration, was polymerized to benzene. The pure hydrogen produced at the end was to be used as a chemical reagent. It is to be understood, of course, in the present invention, although the production of carbon black is the primary objective, the concurrent production of such valuable hydrocarbons as acetylene, butadiene and benzene is always recommended, since the "spent gas" exhausting either from the ethylene or acetylene reactors is quite satisfactory as inlet gas for the production of carbon black.

Equally well, it should be understood that I almost invariably build a multiple number of pairs of reactors (25 and 26). At least two such pairs working alternately are always desirable, in order to keep blowers 1, 13 and 38 on full-time operation since the investment cost in blowers is greater than the cost of constructing added reactor chambers.

In addition to operating several pairs of reactors in parallel, it is frequently advisable to operate them in series i. e., pass natural gas through a reaction chamber, subject the gas therein to a controlled thermal treatment whereby to convert a part of its carbon content to carbon black; remove this "primary" carbon black with a Cottrell precipitator; then pass the gas through a second reactor to produce a second "cut" of carbon black which is removed in a second Cottrell precipitator to produce "secondary" carbon black. In this fashion, a single plant will be able to produce desired tonnages of blacks of varying qualities to conform to the market demand for the various grades.

The characteristic "quality" of the various blacks now produced and marketed has never been described in terms of specific physical and chemical properties. In large measure perhaps, particle size is the dominating factor in determining "quality." There are some nine standard grades of "channel" black, probably arranged in the order of particle size. The so-called "superspectra" (130 Å.) is the finest and coarser grades of CB may run as large as 300 Å. A particularly high priced carbon black (at 430 Å.) is the so-called "acetylene black" which commands an important but limited market. A desirable black, known in the trade as P-33 (at 740 Å.) is in considerable demand in compounding rubber. The experimental evidence available to the writer is not sufficiently conclusive to permit a quantitative correlation between the time-temperature relationships in the thermal treatment of the several hydrocarbons and the physical properties of the black produced. In general, it can be stated that low-temperature cracking of methane produces the smallest particle sizes.

Although methane is more than 90% decomposed at all temperatures above 1800° F., the controlling factor in producing low-temperature blacks is the discouragingly long time at which the methane must be held in order that its conversion may be reasonably complete. If $c$ represents the residual percentage of methane in a reacted gas, if $t$ is time in seconds, the rate of the reaction (which appears to be unimolecular) is given as $$dc/dt = kc \qquad (5)$$

in which $k$ is the velocity constant. The value of the velocity constant is given as $$\text{Log}_{10} k = 17.012 - 21{,}150/T \qquad (6)$$

where T is the temperature in degrees Kelvin. The enthalpy of activation indicated here (96,800 cal. per mol.) agrees reasonably well with the anticipated value for the uncatalyzed reaction based on the energy of the C–H bonds severed. From the kinetic relations indicated by Equation 6 above, it is seen that a very large volume of reaction space is required when any reasonable approach to thermodynamic equilibrium is attempted at low reaction temperatures. A practical solution of this technical problem, of course, is to thermally treat natural gas which is paid for and on its way to be burned in steam boiler plants, cement kiln, open hearth furnaces and other heating processes. In such a case, a low yield of carbon per M of gas is economically permissible. Another answer is to treat natural gas at low temperature, with a low yield and then, after removing CB quality black, pass the exhaust gas through a second set of reactors operating at a higher temperature, to complete the decomposition of the hydrocarbons, to produce TB and FB quality of larger particle size. By changing the time-temperature history of this

What I claim is:

1. The process which comprises, as a first step, forcing a gas containing decomposable hydrocarbon to traverse the interstitial spaces in a bed of gravitationally deposited, chaotically disposed, relatively small, refractory particles, initially partially clogged with an accumulation of deposited carbon preheated to an elevated temperature of at least 1800° F. and adapted to effect substantially complete thermal destruction of the hydrocarbon into hydrogen gas and elementary carbon causing substantially complete thermal destruction of a substantial portion of the said hydrocarbon into carbon black and hydrogen gas and endothermically cooling the bed; as a second step, restoring the bed to the said initial reactive temperature by forcing a heat carrying gas, preheated to at least 1800° F., to traverse the bed; and repeating the said first and second steps in alternating succession the decomposable gas in the first step and the heat carrying gas in the second step each containing insufficient oxidizing constituents to oxidize any substantial amount of the said deposited carbon.

2. The process of producing carbon black from natural gas which comprises, as a first step, regeneratively preheating a stream of hydrogen to an elevated reactive temperature adapted to effect substantially complete thermal destruction of the hydrocarbon into hydrogen gas and elementary carbon, forcing the heated hydrogen to traverse an enclosed bed of gravitationally deposited, chaotically disposed, relatively small refractory particles partially clogged with an accumulation of deposited carbon maintained immobile in a reaction chamber, thus heating a portion of the said bed to the said reactive temperature, and recycling the said hydrogen in a closed re-entrant circuit; and, as a second step, forcing a stream of natural gas substantially free from added oxidizing gas to traverse the said heated assemblage, causing a substantial portion of the hydrocarbon content of the natural gas to thermally decompose into hydrogen and elementary carbon, discharging the said decomposed gas and carbon particles from the chamber, extracting the carbon therefrom; and continuing the said first and second steps in repetitive alternating succession, the hydrogen in the first step containing insufficient oxidizing constituents to oxidize any substantial amount of the said deposited carbon.

3. The process of producing carbon black by the substantially complete destructive decomposition of natural gas into its elements which comprises, as a first step, heating a bed of relatively small, chaotically deposited, refractory solids, partially clogged with deposited carbon by forcing a stream of gas containing hydrogen as a major constituent, preheated to a reaction temperature of at least 1800° F., adapted to effect substantially complete thermal destruction of hydrocarbons into hydrogen gas and elementary carbon by passage through a regenerative heat interchanger; as a second step, causing a stream of natural gas essentially free from added oxidizing gas to traverse the bed; and continuing the first and second steps in repetitive alternating succession, the said gas containing hydrogen in the first step and the natural gas in the second step containing insufficient oxidizing constituents to oxidize any substantial amount of the said deposited carbon.

4. The process of producing carbon black which comprises, as a first step, forcing a gas containing a decomposable hydrocarbon substantially free from added oxidizing constituents to traverse a thermally insulated bed of gravitationally deposited, chaotically disposed, relatively small refractory particles, the interstitial voids in the bed being partially clogged with deposited carbon remanent from prior operation, the bed being initially preheated to an elevated reactive temperature adapted to effect substantially complete thermal destruction of the hydrocarbon into hydrogen gas and elementary carbon, the said gas being forced through the bed at a flow rate adapted to expose the gas to the said reactive temperature for a length of time adequate to effect substantially complete thermal destruction thereof, and terminating the said first step before the decomposition of the hydrocarbon has cooled the bed to a non-reactive temperature; as a second step, reheating the bed to reactive temperature by forcing therethrough a heat carrying gas preheated before entrance into the bed to at least the said reactive temperature, the heat carrying gas being substantially free from oxidizing constituents and chemically inert with respect to the said deposited carbon, and repeating the two steps in alternating sequence.

5. The process described in claim 4 wherein the preheated non-oxidizing heat carrying gas is predominantly hydrogen and substantially free from significant amounts of products of fuel combustion.

6. The process described in claim 4 wherein the hydrocarbon is natural gas.

7. The process described in claim 4 wherein the hydrocarbon is petroleum.

8. The process described in claim 4 wherein the said preheated heat carrying gas, after passing through the refractory particles, is re-circulated through the system repeatedly.

9. The process of producing carbon black which comprises, as a first step, heating a granular bed of gravitationally deposited, chaotically disposed, relatively small refractory particles partially clogged with an accumulation of deposited carbon to an elevated reaction temperature adapted to effect substantially complete thermal destruction of hydrocarbons into hydrogen gas and elementary carbon, by forcing through the bed a regeneratively preheated, thermally stable, heat carrying gas chemically inert with respect to carbon; as a second step, forcing a gas consisting essentially of decomposable hydrocarbon and relatively free from admixture with oxidizing constituents, into thermally destructive contact with the said heated refractory solids and continuing the said first and second steps in alternating succession, the heat carrying gas in the first step and the hydrocarbon gas in the second step containing insufficient oxidizing constituents to oxidize any substantial amount of carbon accumulating in the said bed.

10. In the thermal process of producing carbon black in two alternating steps wherein as a first step a gas traversable mass of refractory bodies is heated to a temperature adapted to effect substantially complete thermal destruction of hydrocarbons into hydrogen gas and elementary carbon by passage therethrough of a heated gas and cooled by the passage therethrough of a gas containing a decomposable hydrocarbon which is substantially free from oxidizing constituents, whereby a substantial portion of the hydrocarbon is decomposed into hydrogen gas and elementary carbon and whereby carbon unavoidably is deposited on the said refractory bodies, the improvement which consists in that the heated gas is regeneratively preheated prior to entry into the said mass to a temperature adapted to effect substantially complete thermal destruction of the hydrocarbon into hydrogen gas and elementary carbon and contains insufficient oxidizing constituents to oxidize any substantial amount of the said deposited carbon.

11. The process of claim 10 in which the said heated gas is predominantly hydrogen.

12. The process of claim 10 in which the said heated gas is recycled, passing through a preheated regenerative heat interchanger and through the said gas traversable mass along a re-entrant passage.

13. In the thermal process of producing carbon black in a succession of two repetitive alternating steps wherein as a first step a gas traversable mass of refractory bodies is heated to a temperature, T, adapted to effect substantially complete destructive decomposition of hydrocarbons into hydrogen gas and elementary carbon by passage therethrough of a gas heated at least to the temperature, T, and as a second step cooled by the passage therethrough of a gas containing a decomposable hydrocarbon which is substantially free from added oxidizing constituents, the improvement which consists in that the said mass consists of a bed of gravitationally deposited, chaotically disposed, relatively small, refractory particles, the interstitial void spaces in the said mass being partially clogged with an accumulation of deposited carbon entrapped therein during repetitions of the second step, the heating gas containing insufficient oxidizing constituents to oxidize any substantial amount of said deposited carbon whereby the deposited carbon remains substantially intact therein during the first step.

PERCY H. ROYSTER.

REFERENCES CITED

The following references are of record in the file of this patent:

UNITED STATES PATENTS

| Number | Name | Date |
| --- | --- | --- |
| 1,276,385 | McCourt | Aug. 20, 1918 |
| 1,276,487 | Brownlee | Aug. 20, 1918 |
| 1,987,643 | Spear | Jan. 15, 1935 |
| 2,106,137 | Reed | Jan. 18, 1938 |
| 2,319,679 | Hasche | May 18, 1943 |